United States Patent
Schlang et al.

(10) Patent No.: US 6,807,449 B1
(45) Date of Patent: Oct. 19, 2004

(54) METHOD FOR CONTROLLING AND PRE-SETTING A STEELWORKS OR PARTS OF A STEELWORKS

(75) Inventors: Martin Schlang, München (DE); Frank-Oliver Malisch, Neubiberg (DE); Otto Gramckow, Uttenreuth (DE)

(73) Assignee: Siemens Aktiengessellscaft, Munich (DE)

( * ) Notice: Subject to any disclaimer, the term of this patent is extended or adjusted under 35 U.S.C. 154(b) by 0 days.

(21) Appl. No.: 09/463,524
(22) PCT Filed: Jul. 13, 1998
(86) PCT No.: PCT/DE98/01952
§ 371 (c)(1), (2), (4) Date: Apr. 19, 2000
(87) PCT Pub. No.: WO99/05577
PCT Pub. Date: Feb. 4, 1999

(30) Foreign Application Priority Data

Jul. 24, 1997 (DE) ........................................ 197 31 980

(51) Int. Cl.$^7$ ............................................. G05B 13/02
(52) U.S. Cl. ........................... 700/48; 700/173; 706/23; 706/52
(58) Field of Search ........................... 700/29, 48, 146, 700/173; 706/23, 56, 52

(56) References Cited

U.S. PATENT DOCUMENTS

| | | | |
|---|---|---|---|
| 5,414,619 A | | 5/1995 | Katayama et al. |
| 5,513,097 A | * | 4/1996 | Gramckow et al. ............ 700/48 |
| 5,600,758 A | * | 2/1997 | Broese et al. .................. 706/23 |
| 5,608,842 A | * | 3/1997 | Broese et al. .................. 706/23 |
| 5,727,127 A | * | 3/1998 | Schulze Horn et al. ....... 706/52 |
| 5,740,686 A | * | 4/1998 | Martinetz et al. ............. 72/8.4 |
| 5,778,151 A | * | 7/1998 | Gramckow et al. ........... 706/20 |

FOREIGN PATENT DOCUMENTS

| | | |
|---|---|---|
| DE | 31 33 222 | 1/1988 |
| DE | 41 05 321 | 8/1992 |
| DE | 41 31 765 | 3/1993 |
| DE | 43 01 130 | 7/1993 |
| DE | 44 16 317 | 11/1994 |
| DE | 44 16 364 | 11/1994 |
| DE | 43 38 615 | 5/1995 |
| DE | 43 38 607 | 6/1995 |
| DE | 44 39 986 | 6/1995 |
| DE | 43 38 608 | 8/1995 |
| DE | 195 22 494 | 6/1997 |
| DE | 196 25 442 | 1/1998 |
| DE | 196 41 431 | 4/1998 |
| DE | 196 41 432 | 4/1998 |
| DE | 196 42 918 | 4/1998 |
| DE | 196 42 919 | 4/1998 |
| DE | 196 42 921 | 4/1998 |
| EP | 0 534 221 | 3/1993 |
| JP | 08016215 | 1/1996 |
| WO | WO 96/01705 | 1/1996 |

OTHER PUBLICATIONS

Thomas "Martinetz et al., Neuronale Netze zur Steurung von Walzstraβen", Bd. 38, Oct. 1996*.

* cited by examiner

*Primary Examiner*—Leo Picard
*Assistant Examiner*—Sheela S. Rao
(74) *Attorney, Agent, or Firm*—Baker Botts LLP

(57) ABSTRACT

Method for controlling and preconfiguring a steelworks or parts of a steelworks, the rolling stand or the rolling mill train being controlled and preconfigured by means of a model of the rolling stand or the rolling mill train, the model having at least one neural network whose parameters are matched or adapted to the actual conditions in the rolling stand or in the rolling mill train, in particular to the properties of the strip, the rate at which the parameters are matched or adapted to the actual conditions in the rolling stand or in the rolling mill train, in particular to the properties of the strip, being varied.

12 Claims, 2 Drawing Sheets

METHOD FOR CONTROLLING AND PRE-SETTING A STEELWORKS OR PARTS OF A STEELWORKS

FIELD OF THE INVENTION

The present invention relates to a method for controlling and preconfiguring a steelworks or parts of a steelworks. In this context, the term parts of a steelworks is intended to mean rolling mill trains, rolling stands, continuous or strip casting systems and units for heat treatment or cooling.

The present invention also relates to a method for controlling and/or preconfiguring a rolling stand or a rolling mill train for rolling a strip, the rolling stand or the rolling mill train being controlled and/or preconfigured by means of a model of the rolling stand or the rolling mill train, the model having at least one neural network whose parameters are matched or adapted to the actual conditions in the rolling stand or in the rolling mill train, in particular to the properties of the strip.

BACKGROUND INFORMATION

In order to control and preconfigure rolling stands or a rolling mill train for rolling a strip, models may be used which have at least one neural network whose parameters are matched or adapted to the actual conditions in the rolling stand or in the rolling mill train, in particular to the properties of the strip. Model-assisted control or preconfiguration of this type is in particular possible for applications as described in DE 41 31 765, EP 0 534 221, U.S. Pat. No. 5,513,097, DE 44 16 317, U.S. Pat. No. 5,600,758, DE 43 38 608, DE 43 38 615, DE 195 22 494, DE 196 25 442, DE 196 41 432, DE 196 41 431, DE 196 42 918, DE 196 42 919, DE 196 42 921. If they are adapted on-line, neural networks for these applications are adapted at constant adaptation rates. This means that, on the basis of each strip which is rolled, the error function for this strip is calculated. The leave of this error function is then determined and, with a view to a gradient optimization, a procedure is adopted whereby the error function is reduced by the chosen adaptation rate. It has been shown that, using on-line adaptation, the term on-line adaptation being intended to mean the adaptation of a neural network on the basis of a strip which is rolled, the quality of rolled steel is significantly improved. Difficulties are, however, found in terms of reliability problems pertaining to the convergence during the adaptation. If, because of deficient adaptation to malfunctioning, incorrect control or deficient preconditioning arise, this may lead to large losses for the application on account of inferior rolled steel or damage to the rolling mill train. Furthermore, because of the high investment costs for a rolling mill train, downtimes are very expensive. This being the case, the adaptation of neural networks for the control or preconfiguration of rolling stands or rolling mill trains is problematic.

SUMMARY

An object of the present invention is to provide a method for making the control or preconfiguration of a steelworks or parts of a steelworks more reliable. It is furthermore desirable to improve the accuracy of the model values determined by means of a neural network.

The object is achieved according to the invention by providing a method in which the rate at which the parameters are matched or adapted to the actual conditions in the rolling stand or in the rolling mill train, in particular to the properties of the strip, is varied. It is in this way possible, for example, to distinguish whether the neural network has already properly mastered the function to be approximated at the corresponding point, whether the data point belongs to an infrequent event, that is to say to steel which is rarely rolled, or whether, because of a measuring error or an error in the subsequent calculation, the data point to be trained is in fact completely unusable. This leads to much more robust adaptation. In an advantageous embodiment of the present invention, the rate at which the parameters are matched or adapted to the actual conditions in the rolling stand or in the rolling mill train, in particular to the properties of the strip, is varied as a function of the information density, in particular the training data pertaining to strips of the same or a similar type.

The information density D is in this case an (abstract) measure of how much information is present at a given point in the input space (typically, how many strips of the same or a similar quality have already been rolled). An illustrative embodiment for a definition of the information density is $$D(x_n) = \sum_{k=1}^{sizenet} b_k(x_n) D_k(x_n)$$

$D(x_n)$ is the estimate of the information density for point xn, after treating all the patterns $x_1$ to $x_{n-1}$. $b_k(x_n)$ is the activity of the k-th neuron in the hidden plane or the hidden planes of the neural network on application of the pattern $x_n$. $D_k(x_n)$ is the estimate of the local information density at the site of the k-th neuron, after processing all patterns $x_1$ to $x_{n-1}$. sizenet corresponds to the number of neurons in the hidden plane or the hidden planes of the neural network. $b_k$ is calculated from $$b_k(x_n) = \exp\left(-\frac{1}{2}(x-\mu)^T \sum\nolimits^{-1}(x-\mu)\right)$$

$$\text{with } x = \begin{bmatrix} x_1 \\ x_2 \\ \vdots \\ x_n \end{bmatrix}$$

$$\mu = \begin{bmatrix} \mu 1 \\ \mu 2 \\ \vdots \\ \mu n \end{bmatrix} \text{ and}$$

$$\sum\nolimits^{-1} = \begin{bmatrix} \frac{1}{2}\sigma_1 & 0 & \cdots & 0 \\ 0 & \frac{1}{2}\sigma_2 & & \vdots \\ \vdots & & \ddots & \\ 0 & \cdots & & \frac{1}{2}\sigma_n \end{bmatrix}$$

$\mu i$ being the expected value and $\sigma^2_i$ the variance of $x_i$.

$D_k(x_n)$ is calculated as:

$$D_k(x_n) = \frac{I_k(x_n)}{I(x_n)}$$

$I_{k(xn)}$ is the information accumulated locally over the entire history of all patterns $x_n$ to $x_{n-1}$ at the k-th neuron of the hidden plane or of the hidden planes of the neural network, $I(x_n)$ is the information similarly acquired overall in the network. $I_k(x_n)$ is calculated as $$I_k(x_n) = \sum_{x'=\{x_1 \ldots x_{n-1}\}} b_k(x')f(E(x'), \eta(x'))$$

f is a function of the prognosis error E(x') (see below) and the learning rate η(x'). It takes into account that, for the patterns learned in the past only with a low learning rate, there is only a small amount of information. In the simplest case, it would be possible to set $$f=1 \forall (x' \in x_1 \ldots x_{n-1})$$

For $I(x_n)$:

$$I(x_n) = \sum_{k=1}^{sizenet} I_k(x_n) = \sum_{x'=\{x_1 \ldots x_{n-1}\}} f(E(x'), \eta(x'))$$

Since, for all $x' \in \{x_1 \ldots x_{n-1}\}$, then $$\sum_{k=1}^{sizenet} b_k(x') = 1$$

In a further particularly advantageous embodiment of the present invention, the rate at which the parameters are matched or adapted to the actual conditions in the rolling stand or in the rolling mill train, in particular to the properties of the strip, is varied as a function of the expected error, in particular the average error over the entire adaptation phase or the average error over a long time interval during the adaptation.

The expected error F is, for example, the average error over the entire history at the point $x_n$ in space. It may, for example, be of the following form:

$$F(x_n) = \sum_{k=1}^{sizenet} b_k(x_n)F_k(x_n)$$

$F_k(x_n)$ being the local expected error for the n-th pattern at the k-th neuron of the hidden plane of a neural network. If $F_k(x_n)$ is given as $$F_k(x_n) = \frac{\sum_{x'=\{x_1 \ldots x_{n-1}\}} b_k(x')E(x')f(E(x'))}{I_k(x_n)}$$

Through multiplication of the error E(x') with $b_k(x')$, the numerator contains a measure of the local error. This error is divided by the local information density.

A further approach for calculating the expected error is for the calculation to be carried out in the form of local statistics, in which not only the average of the local error but also its variance are taken into account.

In a further advantageous refinement of the invention, the rate at which the parameters are matched or adapted to the actual conditions in the rolling stand or in the rolling mill train, in particular to the properties of the strip, is varied as a function of the current error during the adaptation, i.e., the current error between the conditions in the rolling stand and/or in the rolling mill train, in particular the properties of the strip, determined by means of the neural network and the actual conditions.

The current error E is, for example, the Euclidean or other distance between the network prediction, i.e., the value determined by means of the neural network, and the actual value. The Euclidean distance, which is advantageously used as the current error E, is defined as $$E=(y_n(x_n,w)-t_n(x_n))^2$$

$x_n$ being the input variable or the input variables of the network, $y_n(x,w)$ being the output variable, for example the rolling force, of the neural network for a pattern $x_n$ as a function of the network weights w, and $t_n(x)$ the actual value corresponding to $y_n(x_n,w)$. n corresponds to the chronological sequence of the training patterns.

A case distinction is drawn according to the invention for at least one of the three variables information density, expected error and current error. In this case, in a particularly advantageous embodiment of the present invention, distinction is made between a normal case (well-trained network), unusual case (typically a very infrequently rolled steel, for example coin steel), aberrant (for example due to failure of a measuring sensor) and an unstable process (for a very similar type of steel, the target value in the past fluctuate considerably). The degree of the adaptation of the network is chosen in accordance with this error distinction, as shown by Table 1. In this case, ↑ indicates high, ↓ indicates low (possibly equal to zero) and → indicates medium.

TABLE 1

Case distinction for the adaptation rate

| | Information density | Expected error | Current error | Degree of adaptation/ adaptation rate |
|---|---|---|---|---|
| Well-trained network (normal) | ↑ | ↓ | ↓ | ⇒ |
| Well-generalized unusual case | ↓ | ↑ or ↓ | ↓ | ⇒ |
| Poorly generalized unusual case | ↓ | ↑ or ↓ | ↑ | ↑ |
| Aberrant | ↑ | ↓ | ↑ | ↓ |
| Unstable process | ↑ | ↑ | ↑ or ↓ | Termination alarm |

If the information density is high, the expected error is low and the actual error is low, then a well-trained network is assumed and the adaptation rate is kept at a medium value. If the information density and the current error are small, then it is assumed that the neural network, in the case of an infrequent kind of steel, i.e., an unusual case, achieves good generalization. The adaptation rate is kept at a medium value. If, however, the current error is high with a small information density, then the adaptation rate is increased. A combination in which the information density and the current error are high, but the expected error is small, is interpreted as aberrant and the adaptation rate is accordingly reduced, or no adaptation takes place. If both the information density and the expected error are high, this is assessed as an indication of an unstable adaptation process. The adaptation is terminated.

The method according to the present invention is maybe used in conjunction with the applications described in DE 41 31 765, EP 0 534 221, U.S. Pat. No. 5,513,097, DE 44 16 317, U.S. Pat. No. 5,600,758, DE 43 38 608, DE 43 38 615, DE 195 22 494, DE 196 25 442 DE 196 41 432, DE 196 41 431, DE 196 42 918, DE 196 92 919, DE 196 42 921.

DETAILED DESCRIPTION

Figure 1:
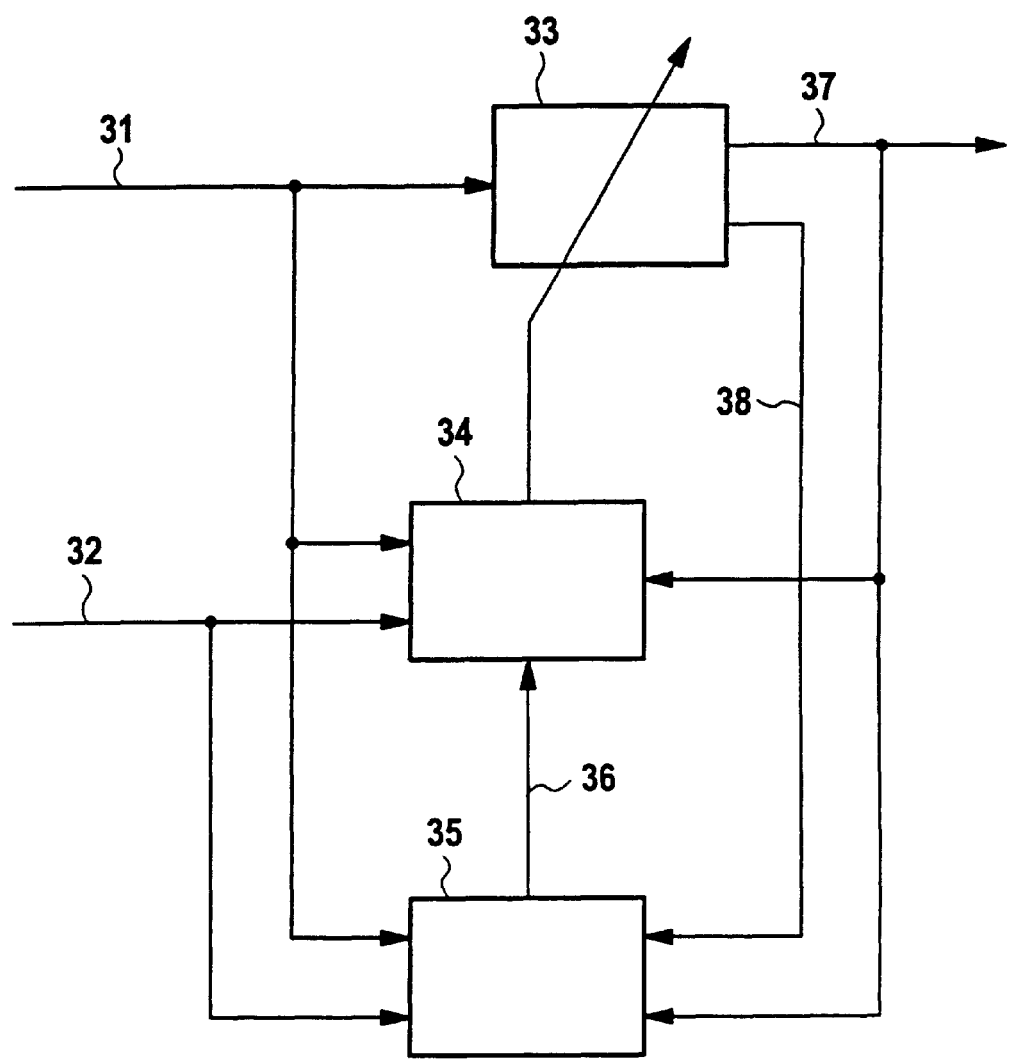
FIG. 1 shows the method according to the present invention

FIG. 1 shows an outline representation of the method according to the present invention. In this case, the reference number 33 denotes a neural network, the reference number 34 denotes an adaptation algorithm and the reference number 35 denotes the determination of the adaptation rate 36 of the neural network 33. On the basis of input variables 31, the neural network calculates output variables 37. In order to adapt the neural network 33, these input variables 31 and output variables 37 are also fed to an adaptation algorithm 34 which compares the network response, i.e., the output variables 37 of the neural network 33, with corresponding actual values 32. On the basis of these variables, the adaptation algorithm 34 adapts the parameters of the neural network 33. In accordance with the method according to the present invention, the adaptation rate 36 for the adaptation algorithm 34 is determined on the basis of at least one of the variables 31, 32, 37 or the internal state variables 38 of the neural network 33. Of course, the variables 31, 32, 37 and 38 are not necessary scalars, but may also be multiple variables. Thus, for example, the input variables 31 may be variables such as the strip thickness, the strip width, the strip temperature, the alloy components of the strip, etc. An example of a possible output variable 37 of the neural network 33 is a correction value for the rolling force.

Figure 2:
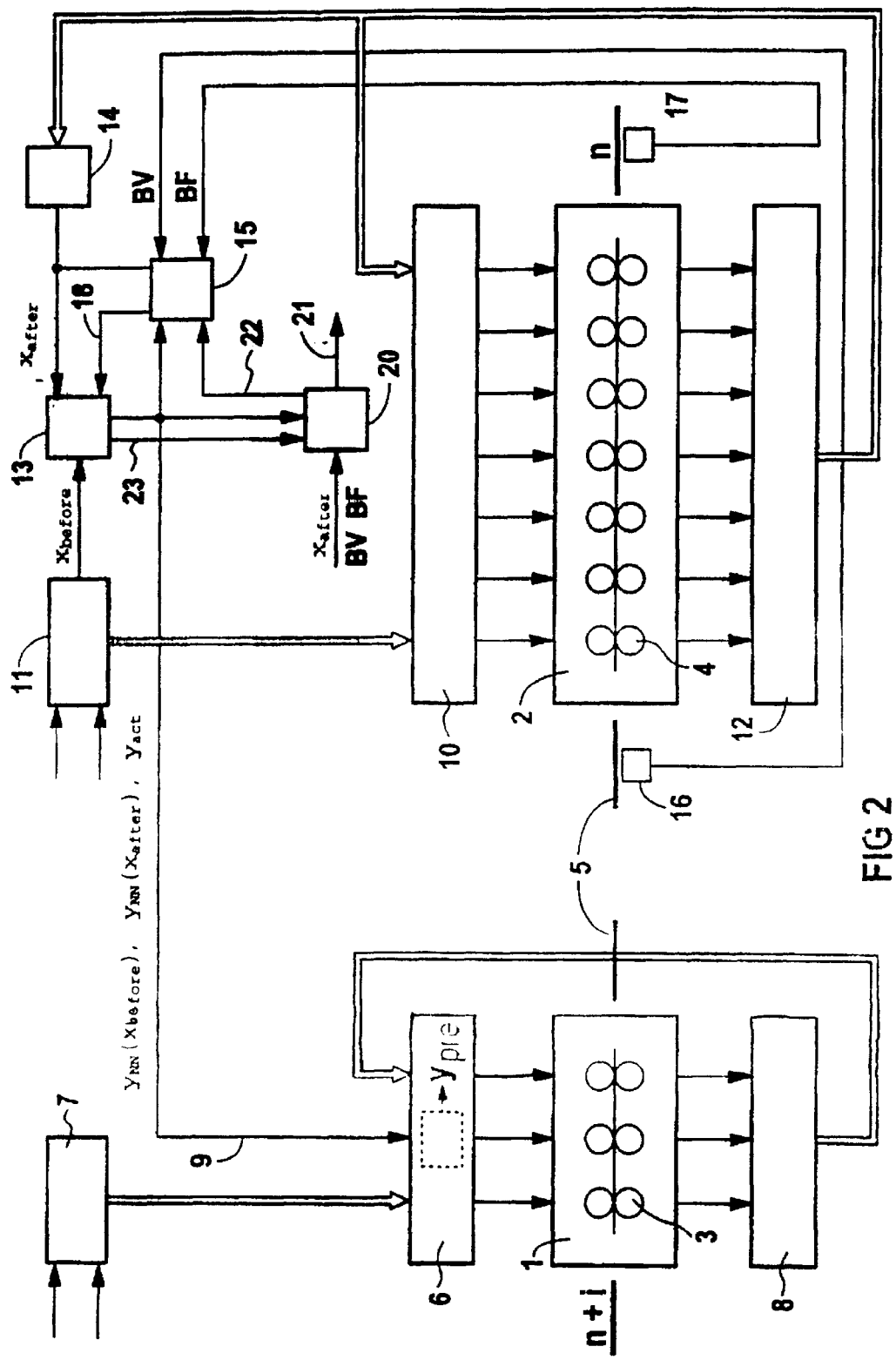
FIG. 2 shows a block circuit diagram for the process control in a preliminary and a final mill train in accordance with the method according to the present invention.

FIG. 2 shows a preliminary mill train 1 and a final mill train 2, with rolling stands 3 and 4, respectively, for rolling metal strips 5. The preliminary mill train 1 is controlled by a control device 6 which acts on the individual rolling stands 3 and operates different actuators. The control device 6 obtains the information needed to control the rolling stands 3 both from a computer unit 7 and from a device 8 for detecting measured values. At the start of the rolling process, there are not yet any measured values for the variables needed to regulate the process. For this reason, predicted values for the variables are calculated in the computer unit 7 on the basis of modeling assumptions, and communicated to the control device 6 in order to preconfigure the preliminary mill train 1. During the course of the process, measured values of the variables used for regulating the process are detected by the device 8 for detecting measured values and are fed to the control device 6.

Via a link 9, the control device 6 furthermore obtains information for determining a predicted value $y_{pre}$ for the expected width variation of the metal strip 5 in the final mill train 2. On the basis of this predicted value $y_{pre}$, the rolling process, i.e., the compression of the metal strip 5 in the preliminary mill train 1, is controlled in such a way that the preliminary strip width, i.e., the width of the metal strip 5 when it emerges from the preliminary mill train 1, is equal to the desired target final strip width for the metal strip 5 when it emerges from the final mill train 2, less the predicted width variation $y_{pre}$ of the metal strip 5 in the final mill train 2. In this way, the affect achieved when there is an accurate prediction of the width variation of the metal strip 5 in the final mill train 2, is that the metal strip 5 has the desired target final strip width when it emerges from the final mill train 2.

As in the preliminary mill train 1, the individual rolling stands 4 are controlled in the final mill train 2 by a control device I 0 which receives the information needed for this from a computer unit 11 and a device 12 for detecting measured values. Before a metal strip 5 passing through the preliminary mill train 1 enters the final mill train 2, predicted values of the variables needed for regulating the rolling process in the final mill train 2 are calculated in the computer unit 11 and sent to the control device 10 in order to preconfigure the final mill train 2. Of these variables determined in advance, those which may have an influence on the width variation of the metal strip 5 in the final mill train 2 are fed as input variables $x_{before}$ to a neural network 13 which, as network response, produces a computed value $y_{NN}(x_{before})$ for the width variation, and provides this on the link 9 for calculating the predicted value $y_{pre}$ in the control device 9. The following variables, which form the input vector $x_{before}$, are in particular suitable as influencing variables or input variables for the neural network 13.

When the metal strip 5 passes through the final mill train 2, the process-relevant variables including the influencing variables of the preliminary strip temperature, the preliminary strip thickness, the final strip temperature, the final strip thickness, the target final strip width, the rate at which the final strip emerges from the final mill train 2, the strength of the material, the profile, the relative thickness reductions in the individual rolling stands 4, the various lateral positions of the lateral displacement rolls and the tensions in the metal strip 5 between the individual rolling stands 4, are measured by means of the device 12 for detecting measured values and are fed to the controller 10 as well as to a device 14 for after-processing. The after-processing comprises, for example, a statistical treatment of the measured influencing variables and the calculation of influencing variables which cannot be measured directly as a function of other measured variables. With these influencing variables which are measured afterwards, i.e., those which are determined substantially more accurately than the calculation beforehand in the computer unit 11, the network parameters of the neural network 13 are adapted after the metal strip 5 has passed through the final mill train 2. To do this, the influencing variables calculated afterwards are compiled in an input vector $x_{after}$ and sent to the neural network 13. The network response $y_{NN}(x_{after})$ then received from the neural network 13 is fed to an adaptation algorithm 15 which is furthermore fed the actual preliminary strip width WP measured in front of the final mill train 2 at point 16, as well as the actual final strip width WF measured after the final mill train 2 at point 17. The actual width variation $y_{act}$=WF−WP obtained in this way is compared with the network response $y_{NN}(x_{after})$, the discrepancy between the network response $y_{NN}(x_{after})$ and the actual width variation $y_{act}$ being employed via the link 18 for adaptation of the network parameters with a view to reducing this discrepancy. Further to the calculated value $y_{NN}(x_{before})$, the values $y_{NN}(x_{after})$ and $y_{act}$ are also provided on the link 9 and fed to the control device 6 in order to calculate the predicted value $y_{pre}$ for the width variation.

The adaptation algorithm 15 is given a predetermined adaptation rate 22 which is determined by means of an adaptation-rate determiner 20. Besides the values $y_{NN}(x_{before})$, $_{NN}(x_{after})$, $y_{act}$, further input variables in the adaptation-rate determiner 20 are $x_{after}$, WP and WF as well as the internal states 23 of the neural network 13. The adaptation-rate determiner 20 optionally outputs an alarm signal 21 if the information density and expected error are high. This alarm signal 21 is used by a higher-order system for process diagnosis. As a safety measure, the adaptation of the neural network 13 is stopped in such a case.

What is claimed is:

1. A method for controlling and/or preconfiguring a steelworks including parts thereof comprising utilizing a model having a neuronal network with paramaters which are adaptable to actual conditions in the steelworks at a rate determined by distinguishing between at least two variables selected from the group consisting of information density, expected error and actual error.

2. The method according to claim 1, wherein the one of the steelworks and parts of the steelworks includes one of a rolling stand and a rolling mill train.

3. The method according to claim 1, wherein the actual conditions are properties of a strip.

4. The method according to claim 1, wherein the information density includes a number of data pertaining to similar strips.

5. The method according to claim 1, wherein the rate is a function of a current difference between conditions of the steelworks as determined by the neural network, and the actual conditions in the steelworks.

6. The method according to claim 1, wherein varying the rate ceases if an information density is low, an expected error is low, and a current error is low.

7. The method according to claim 1, wherein varying the rate ceases if an information density is low and a current error is low.

8. The method according to claim 1, wherein varying the rate increases if the information density is low and a current error is high.

9. The method according to claim 1, wherein varying the rate describes if the information density is high, expected error is low, and actual error is high.

10. The method according to claim 1, further comprising:
    diagnosing the one of the matching and adapting as deficient if information density is high and expected error is high.

11. The method according to claim 10, further comprising:
    terminating the one of matching and adapting step if the one of the matching and adapting is diagnosed as deficient.

12. The method according to claim 10, further comprising;
    using the diagnosing for diagnosing a rolling process.

* * * * *